E. P. GOODCHILD.
SIGNAL FOR MOTOR VEHICLES.
APPLICATION FILED JAN. 16, 1920.
1,347,945.
Patented July 27, 1920.
2 SHEETS—SHEET 1.
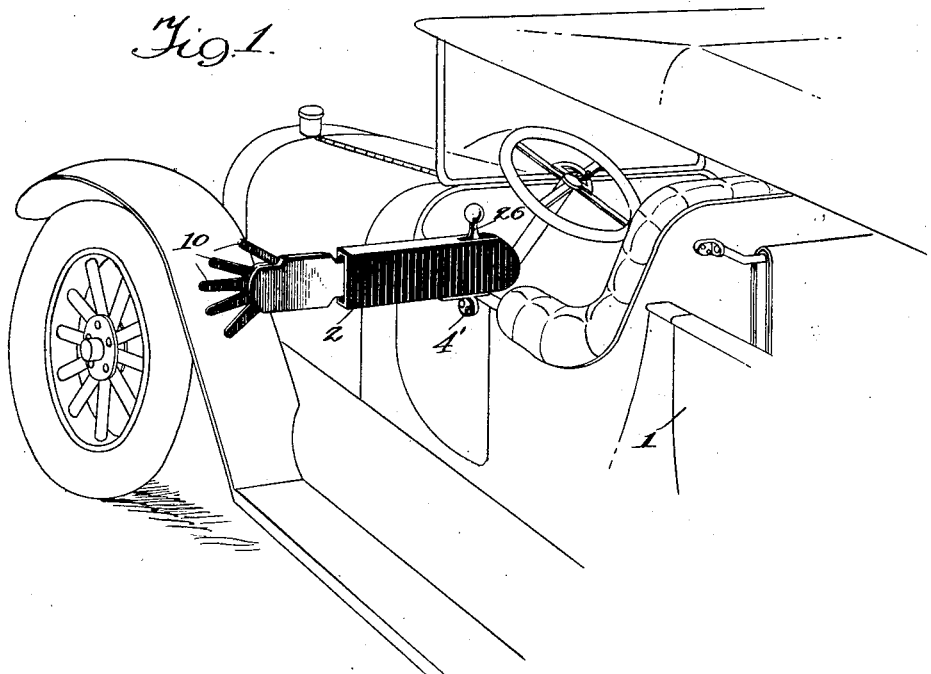
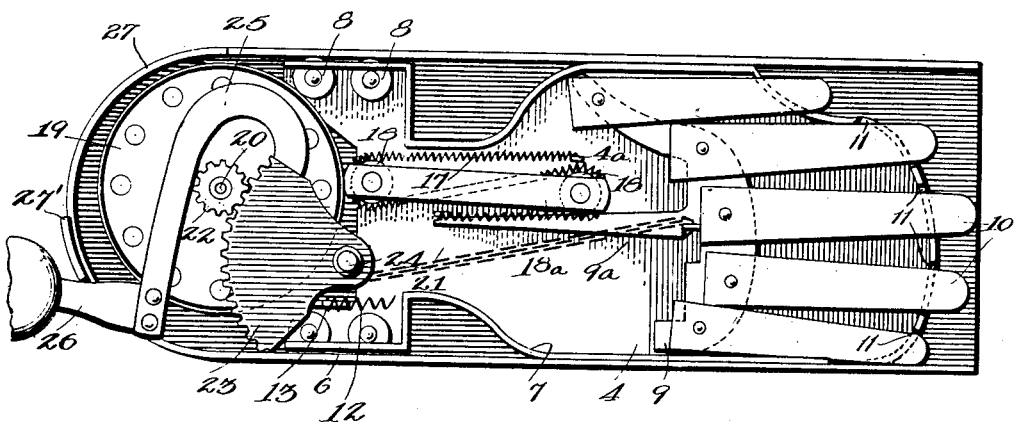
INVENTOR
E. P. GOODCHILD,
BY
ATTORNEYS E. P. GOODCHILD.
SIGNAL FOR MOTOR VEHICLES.
APPLICATION FILED JAN. 16, 1920.
1,347,945.
Patented July 27, 1920.
2 SHEETS—SHEET 2.
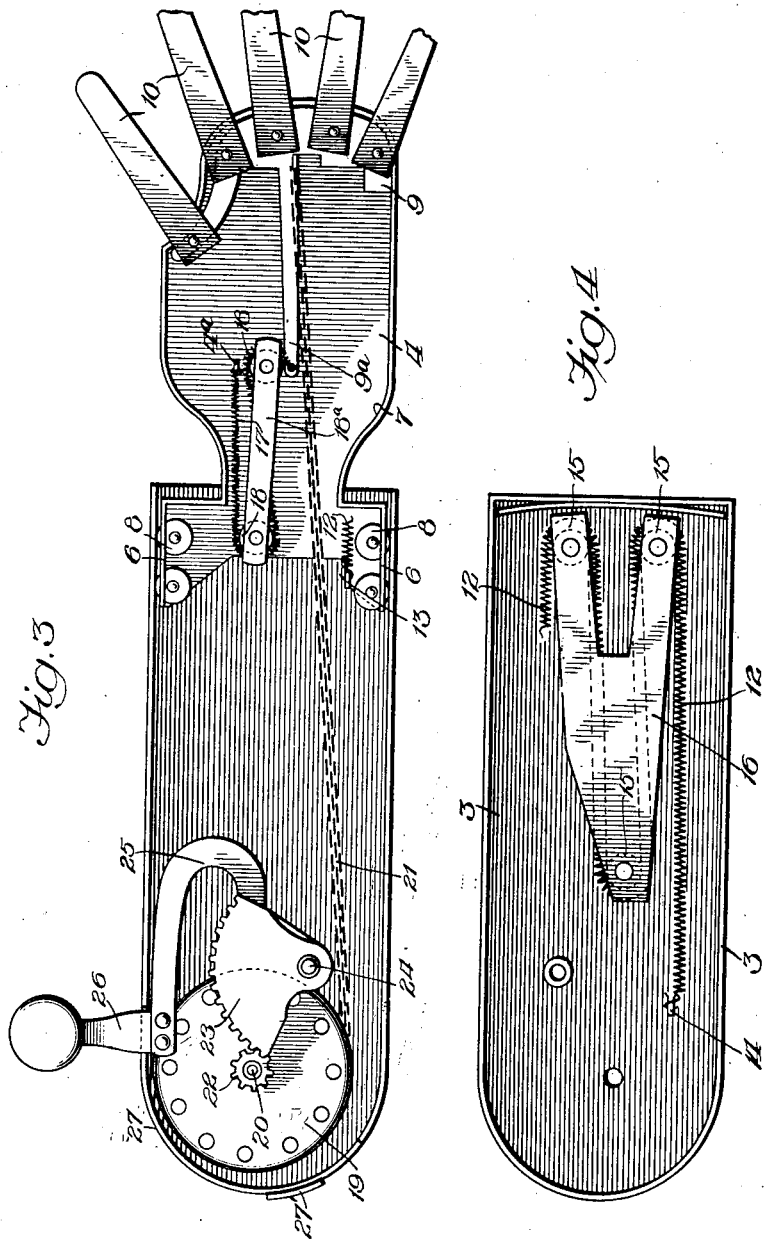
INVENTOR
E.P. Goodchild
BY Munn & Co.
ATTORNEYS

UNITED STATES PATENT OFFICE.

EUCLID P. GOODCHILD, OF SPOKANE, WASHINGTON.

SIGNAL FOR MOTOR-VEHICLES.

1,347,945.  Specification of Letters Patent.  Patented July 27, 1920.

Application filed January 16, 1920. Serial No. 351,849.

*To all whom it may concern:*

Be it known that I, EUCLID P. GOODCHILD, a citizen of the United States, and a resident of Spokane, in the county of Spokane and State of Washington, have invented certain new and useful Improvements in Signals for Motor-Vehicles, of which the following is a specification.

My invention is an improvement in signals for motor vehicles, and has for its object to provide a signal of the character specified, which will indicate to following vehicles, and to those in front, as for instance traffic officers, the intention of the driver in regard to turning or stopping, wherein the signal is in the form of an outstretched hand adapted to be normally held in a casing, and to be expanded by means normally acting to extend the same, and capable of being withdrawn into the casing after it has been extended by the driver.

In the drawings:

Figure 1 is a perspective view of the front of the motor vehicle provided with the improved signal, Fig. 2 is a front view of the signal casing with the cover removed, showing the signal in inoperative position, Fig. 3 is a similar view of the signal in operative position, and Fig. 4 is an inside view of the cover plate.

The present embodiment of the invention is shown in connection with a motor vehicle 1 of usual construction, and the signal casing which is composed of a body 2 and a cover plate 3 is supported adjacent to the driver's seat by a bracket 4'. Within the casing, which is channel shaped and open at one end, the other end being rounded as shown, there is arranged a plate 4 which corresponds roughly to the shape of the hand, the said plate having a reduced wrist portion 5 as shown and an enlarged cuff portion 6.

The plate has a marginal flange 7, and wheels 8 are journaled on the cuff portion of the plate adjacent to the flange, the flange having openings through which the peripheral portions of the wheels extend, into contact with the side walls of the body 1 of the signal casing.

These wheels reduce friction of the plate 4—5—6 when it is moving in the signal casing. A substantially U-shaped bar 9 is mounted to slide on the plate 4 between the side flanges 7, and a series of fingers 10 is pivoted to this bar. The ends of the bar move in contact with the side flange of the plate, and the fingers are of such length that when the bar 9 is at the limit of its inward movement, the fingers will be retracted into the casing.

These fingers pass through slots 11 in the flange 7 at the open end of the casing 2—3, and these slots are so arranged that when the bar 9 moves outwardly, the fingers will be separated at their free ends, as shown more particularly in Figs. 1 and 3.

The plate 4 is normally pressed outward by a coil spring 12. This spring is connected at one end to a lug 13 on the plate, and at the other to a lug 14 on the cover plate 3. The spring passes over direction elements 15 held between the cover plate and arms and body of a Y-shaped plate 16. A very long spring may thus be used, as it is guided by the pulleys, and the action of this spring is to force the plate 4 outwardly at the open end of the casing 2—3, as clearly shown in Fig. 3.

The bar 9 is also acted upon by a spring, normally acting to force the said bar toward the open end of the casing 2—3, that is, in a direction to extend the fingers. This spring 17 is connected at one end to a lug $4^a$ on the plate 4, and at the other end to the inner end of an extension $9^a$ from the center of the bar 9. The spring 17 passes over direction elements 18 which are held between the plate 4 and a bar $18^a$. The spring normally tends to force the bar toward the open end of the casing 2—3 and in a direction to extend the fingers.

The plate is drawn back into the casing against the resistance of the spring by means of a drum 19. This drum is journaled between the body of the casing and the cover plate as indicated at 20, and a flexible member 21, as for instance a chain or the like, is connected to the bar 9 at about its center at one end, the other end winding on the drum 19. The shaft 20, which carries the drum, carries also the pinion 22, which is engaged by the teeth of the gear segment 23 pivoted at 24 in the casing, and a handle 25 is secured to the gear segment for operating the same.

This handle has an operating member or grip 26 which extends through a slot 27 in the closed end of the casing, and the movement of the grip is limited by the ends of the slot. When the grip is moved from the position of Fig. 3 to that of Fig. 2, the drum will be rotated a sufficient distance to draw the bar 9 inwardly as far as it will go, that is, to the position of Fig. 2, after which further movement of the drum will move the plate inward to the position of Fig. 2.

It will be noticed, referring to Fig. 2, that the wall of the body 2 has a catch 27' in position to be engaged by the grip 26 to lock the parts in the position of Fig. 2. When the segment 23 is moved into the position of Fig. 2, the grip 26 will engage behind the catch. In order to set the signal, it is only necessary to release the grip from the catch, and the springs will extend the signal, giving very much the appearance as if the driver threw out his hand.

If it is desired to show the direction of turn, a signal will be arranged at each side. If it is only intended to indicate checking or stopping of the vehicle, but a single signal will be used, and when the out-stretched hand is displayed, it will be an indication to those behind or those in front that the driver intends to stop.

I claim:

1. A device of the character specified, comprising a casing having one end open, a plate mounted to move longitudinally of the casing toward and from the open end, a bar mounted to move on the plate and carrying a series of fingers, the plate having guiding means for the fingers to extend the same laterally when they are extended longitudinally beyond the plate, normally active means for moving the bar toward the open end of the casing, normally active means for moving the plate toward the open end of the casing, and manually controlled means for returning the parts to normal position, said manually controlled means comprising a gear segment having a handle for swinging the same, a drum having a pinion engaged by the gear segment, a flexible member winding on the drum at one end and connected with the bar at the other end.

2. A device of the character specified, comprising a casing having one end open, a plate mounted to move longitudinally of the casing toward and from the open end, a bar mounted to move on the plate and carrying a series of fingers, the plate having guiding means for the fingers to extend the same laterally when they are extended longitudinally beyond the plate, normally active means for moving the bar toward the open end of the casing, normally active means for moving the plate toward the open end of the casing, and manually controlled means for returning the parts to normal position, said manually controlled means comprising a drum arranged within the casing, a flexible member winding on the drum at one end and connecting with the bar at the other, and a handle operatively associated with the drum for rotating the same.

3. A device of the character specified, comprising a casing having one end open, a plate mounted to move longitudinally of the casing toward and from the open end, a bar mounted to move on the plate and carrying a series of fingers, the plate having guiding means for the fingers to extend the same laterally when they are extended longitudinally beyond the plate, normally active means for moving the bar toward the open end of the casing, normally active means for moving the plate toward the open end of the casing, and manually controlled means for returning the parts to normal position, said manually controlled means comprising a drum arranged within the casing, a flexible member winding on the drum at one end and connecting with the bar at the other, and means for operating the drum.

4. A device of the character specified, comprising a casing, a plate shaped to represent a hand movable in the casing, a bar carrying fingers movable with respect to the plate, said plate having means for engagement by the fingers to spread the same when they are moved longitudinally of the plate in one direction, normally operative means for moving said plate and bar, means for returning the plate and bar into the casing, and means for locking the plate and bar within the casing.

5. A device of the character specified, comprising a casing, a plate shaped to represent a hand movable in the casing, a substantially U-shaped bar carrying fingers movable with respect to the plate, said plate having means for engagement by the fingers to spread the same when they are moved longitudinally of the plate in one direction, and normally operative means for moving said plate and bar.

EUCLID P. GOODCHILD.